UNITED STATES PATENT OFFICE.

DAVID A. YORK, OF NORTH GROVE, INDIANA, AND JUSTUS A. TINKER, OF CLEVELAND, OHIO, ASSIGNORS OF ONE-THIRD TO AUGUST W. KRAFT, OF PAINESVILLE, OHIO.

PROCESS OF ENAMELING STEEL AND THE LIKE.

1,017,360.     Specification of Letters Patent.     Patented Feb. 13, 1912.

No Drawing.     Application filed February 9, 1911. Serial No. 607,486.

*To all whom it may concern:*

Be it known that we, DAVID A. YORK and JUSTUS A. TINKER, citizens of the United States, residing at North Grove, in the county of Miami, State of Indiana, and Cleveland, in the county of Cuyahoga and State of Ohio, respectively, have invented new and useful Improvements in Processes of Enameling Steel and the Like, of which the following is a specification.

Our present invention has to do with the enameling of steel and analogous surfaces; and it has for its object to provide a process by the practice of which steel and the like, no matter to what purpose it is put, is rendered sanitary, rust-proof, fire-proof, acid-proof and not liable to be affected by the action of water.

In carrying out our process we employ two formulas, viz:

*Formula A.*

| | |
|---|---|
| Powdered glass | 40 lbs. |
| Borax | 20 lbs. |
| Saltpeter | 10 lbs. |
| Feldspar | 5 lbs. |
| Cobalt oxid (black) | 2½ ounces. |

*Formula B.*

| | |
|---|---|
| Borax | 23 lbs. |
| Feldspar | 30 lbs. |
| Soda | 7 lbs. |
| Saltpeter | 3 lbs. |
| Silica | 38 lbs. |
| Tin oxid | 12 lbs. |
| Kriolita | 18 lbs. |

The ingredients comprised in the foregoing Formula A, viz: powdered glass, borax, saltpeter, feldspar and black cobalt oxid, are first mixed and then melted into a mass. The said mass is then reduced to a fine powder, and such powder is mixed with water and approximately eight pounds of clay.

The ingredients of Formula B, viz: borax, feldspar, soda, saltpeter, silica, tin oxid and kriolita are first mixed and then melted into a mass, which mass is ground to a fine powder and is mixed with water and approximately eight pounds of clay.

After the steel is cleaned with acid or sand blast the first of the mixtures described—*i. e.*, that containing Formula A, is applied in a coat of suitable thickness to the surface of the steel, and then the coated article is dried and burned in the presence of heat ranging from 1600 to 1800 degrees Fahrenheit, or sufficient heat to assure the enamel adhering to the steel and having a smooth and glossy surface. Then the coated article is cooled, whereupon a coat of the second-named mixture—*i. e.*, that containing Formula B, is applied to the first coat, and the article is dried and burned in the same manner as before, in the presence of heat varying from 1600 to 1800 degrees, Fahrenheit. The application of the first coat described to the article to be enameled serves to assure the adherence of the second coat to the article and in that way contributes to the finish and the durability of the enamel as a whole. If the desired result is not attained with one coat of the mixture containing the Formula B, another coat of said mixture is applied and dried and burned in the manner described.

Steel and the like enameled by the process set forth is possessed of all of the qualifications hereinbefore stated, and may therefore be used to advantage in caskets and vaults for burial purposes, for the outer or facing surface of concrete, brick and tile structures, and for ceilings, sidewalls, wainscoting, swimming pools and other tanks, sinks and vats, counter and table coverings, soda fountains, tea and coffee urns, cooking utensils, etc.

The proportions of the ingredients used in the Formulas A and B may be varied without materially changing the results and without affecting our invention. For instance in lieu of the Formula A described, the following Formula $A^2$ may be employed, viz:

*Formula $A^2$.*

| | |
|---|---|
| Powdered glass | 46 lbs. |
| Borax | 20 lbs. |
| Saltpeter | 10 lbs. |
| Feldspar | 5 lbs. |
| Cobalt oxid | 2 ounces. |

And in lieu of the said Formula B, the following Formula B² may be employed, viz:

Formula B².

| | |
|---|---|
| Borax | 28 lbs. |
| Feldspar | 28 lbs. |
| Soda | 4 lbs. |
| Saltpeter | 4 lbs. |
| Silica | 4 lbs. |
| Tin oxid | 10 lbs. |
| Kriolita | 8 lbs. |

In addition to the articles named upon which the enamel may be used to advantage, may be mentioned monuments, gate and fence posts and columns, and we would have it definitely understood that steel or the like enameled in the manner described, may be put to any use to which it is applicable without involving departure from the scope of our claimed invention.

Having described our invention, what we claim and desire to secure by Letters-Patent, is:

The process described of enameling steel and the like, which consists in applying to the steel a coating comprising a plastic mixture of powdered glass, borax, saltpeter, feldspar, cobalt oxid and clay, burning the coated steel, applying to the first coat a coating comprising a plastic mixture of borax, feldspar, soda, saltpeter, silica, tin oxid, kriolita and clay, and again burning the coated steel.

In testimony whereof we have hereunto set our hands in presence of two subscribing witnesses.

DAVID A. YORK.
JUSTUS A. TINKER.

Witnesses:
A. L. TALCOTT,
F. G. MITCHELL.